Patented Apr. 11, 1950

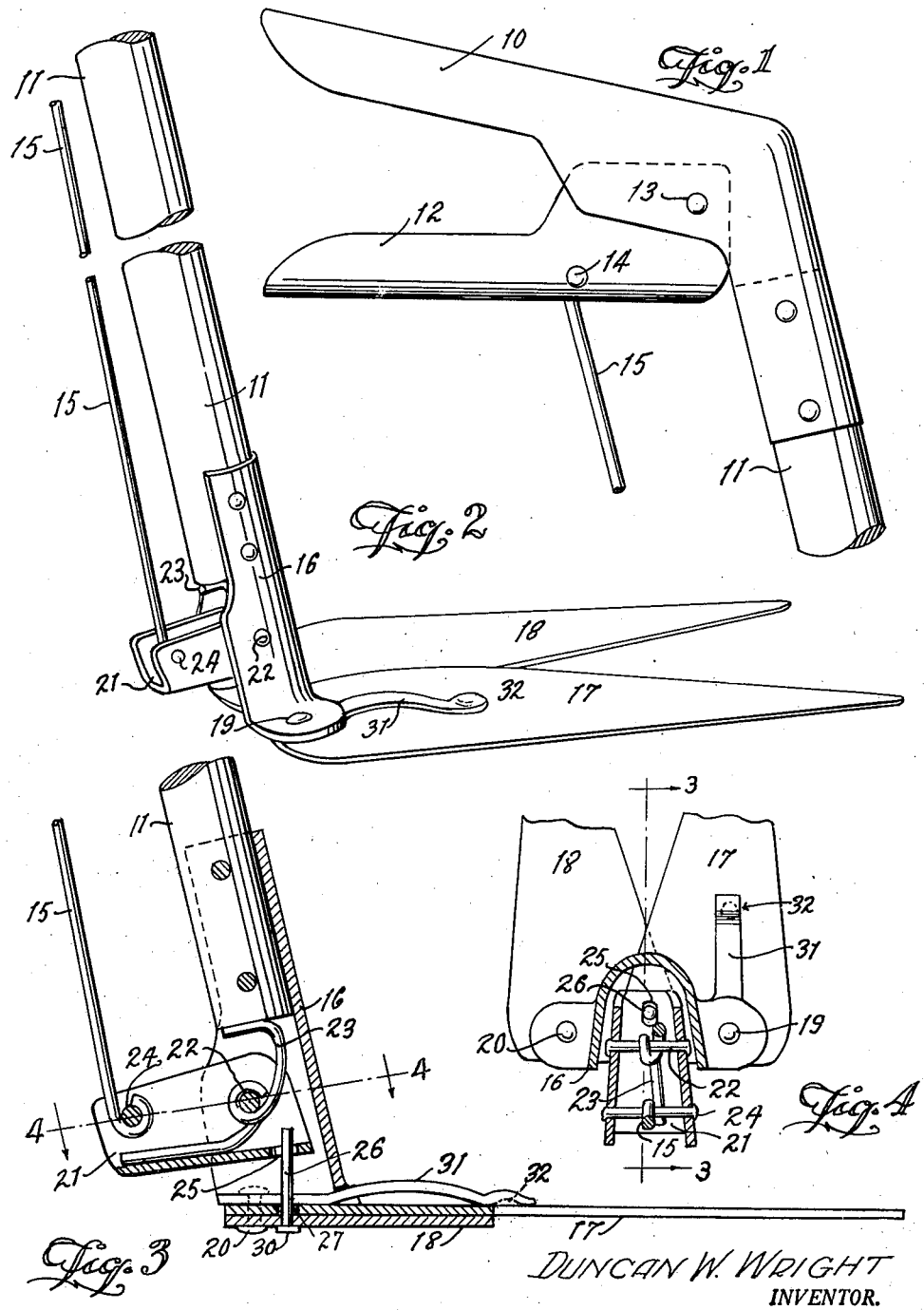

2,503,983

UNITED STATES PATENT OFFICE 2,503,983

GRASS CLIPPERS

Duncan W. Wright, Dallas, Tex.

Application May 24, 1946, Serial No. 671,964

1 Claim. (Cl. 30—248)

This invention relates to clippers or shears and more particularly to clippers or shears used in shearing grasses or weeds common to lawns or other landscaped areas.

The objects of the invention are, first, to provide shears capable of shearing grasses or weeds common to lawns or other landscaped areas, second, to provide shears manually operable by a person in a standing position.

Another object of the invention is to provide shears manually operable independent of any ground engaging elements such as rollers, levers or protrusions for power actuating purposes.

Still another object of the invention is to provide shears so constructed that the depth or gauge of the cut may be alternately determined, at the will of the operator, without the necessity of predetermining the depth of the cut by the setting of levers, rollers or other gauging devices.

Still another object of the invention is to provide shears so constructed as to make accessible grasses and weeds that are most generally inaccessible to conventional shears.

With the foregoing objects as paramount, the invention has further reference to certain features of accomplishment which will become apparent as the description proceeds, taken in connection with the accompanying drawings, wherein:

Figure 1 is a side elevation of the complementary parts of the handle of shears constructed according to the invention and showing the conjunctive relationship of the manually operated lever to the fixed portion of the handle.

Figure 2 is a perspective view of the cutting head of shears constructed according to the invention.

Figure 3 is a side elevation of a cross section of the cutting head of shears constructed according to the invention and disclosing the relationship of the various parts thereof, and Figure 4 is a cross section of the cutting head of shears constructed according to the invention, said cross section having been taken at 4—4 in Figure 3.

Continuing with a more detailed description of the drawings, reference numeral 10 denotes the portion of the handle stationarily affixed to an elongated shaft 11 by means commonly employed in such attachments. A lever 12 complements the handle portion 10 and is operatively attached thereto at pivotal point 13. At 14 on the lever 12 is operatively attached a small rod 15 for transmitting actuating power to the cutting head when parts 10 and 12 are contracted by the grip of the operator.

To the lower extremity of shaft 11 is fixedly attached, by suitable means, the upper conforming part of a bracket 16 to which, in turn and through flanges extending to either side of the lower end of the bracket 16, are operatively attached by suitable means an upper shearing blade 17 and a lower shearing blade 18 at pivotal points 19 and 20, respectively. Also, in the recess integrally formed in the backside of the lower portion of the bracket 16 is a rocking arm 21, substantially U-shaped in transverse section, pivotally mounted on a pin 22 for oscillative displacement. Within the longitudinal recess of the rocking arm 21 is a torsion spring 23 coiled at least once about the pin 22 with one end of said torsion spring resting against the lower end of the shaft 11, the other end thereof being disposed rearwardly along the inside bottom of the longitudinal recess of the rocking arm 21 for the purpose of resisting oscillative displacement of said rocking arm.

Rearwardly of rocking arm 21 is operatively attached, by means of a pin 24, the lower end of rod 15 for purposes of transmitting actuating power for oscillative displacement of said rocking arm. Forwardly and through the bottom of the longitudinal recess of rocking arm 21 is a slot 25 forming a loose fit over the uppermost unengaged or free end of a pin or bolt 26, said bolt or pin extending downward through a slot 27 in upper shearing blade 17 with the bottom end of said bolt or pin fixedly attached to lower shearing blade 18 at point 30.

Between one flange of the bracket 16 and upper shearing blade 17 and operatively attached to said bracket at the same pivotal point is an arcuated spring member 31 extending longitudinally forward with the forward conforming end thereof bearing on a dimple at 32 which is integrally formed in upper shearing blade 17 the arcuated spring 31 being retained in such relationship with said dimple by virtue of tension exerted by said arcuated spring. The force exerted by the arcuated spring 31 maintaining at all times an engaging relationship along the cutting edges of the upper shearing blade 17 and the lower shearing blade 18.

Upon contraction of the grip of the operator on the complementary parts 10 and 12 of the handle, the rod 15 is pulled upward causing oscillative displacement of the rocking arm 21. In such oscillative displacement of the rocking arm 21 the slot 25 therein moves simultaneously downward and backward in a direction describing an arc thereby exerting a backward pull on the pin or bolt 26 loosely engaged by said rocking arm through the slot 25 such pull being transmitted to the two shearing blades by means of said bolt which passes downwardly through a slot in the upper of the two blades and is fixedly attached to the lower of said blades. Such actuating power, when transmitted to the shearing blades, causes a pull against the pivotal fulcrum points 19 and 20 with a resulting inward and opposing oscillative displacement of said blades causing a shearing action along the cutting edges of the upper and lower blades. Contrarily, upon the release of the grip by the operator the resistance of the torsion spring 23 is asserted and under such resistance the rocking arm, bolt and shearing blades are returned to their respective normal disposed positions.

Since the length of rod 15 is dependent only upon the length of shaft 11 and since the length of shaft 11 is optional the length may be that which is desired or necessary to enable the operator of a shears constructed according to the invention to remain in a standing position while cutting grasses or weeds, such a standing position being far less tiring to the operator than the squatting or stooping position that must be assumed when using the conventional type of shears.

Also, inasmuch as there are no ground engaging elements or members for purposes of actuating power and no gauging devices to be set for gauging the depth of the cut the operator may, at will, cut deep or shallow independent and irrespective of the immediate contour of the ground. Too, the extended shaft of the manually operable shears constructed according to the invention will enable the operator to reach grasses or weeds that are generally inaccessible to operators of conventional types of shears.

Manifestly, the construction as shown and described is capable of some modification and such modification as may be construed to fall within the scope and meaning of the appended claims is also considered to be within the spirit and intent of the invention.

What is claimed is:

In a grass and weed shearing device, the combination comprising a pair of relatively pivoted cooperating shearing blades having pivotal means displaceable in a plane parallel to the longitudinal axis of said shearing blades, a rocking arm pivoted above said pivotal means having a slot in one end receiving said pivotal means, a shaft supporting said shearing blades having a handle on its upper end, a rod substantially parallel with said shaft connected at its lower end to the opposite end of said rocking arm and having means adjacent the handle of said shaft for longitudinally reciprocating the same, a torsion spring looped about the pivot of said rocking arm one end thereof exerting a downward thrust on said rocking arm, the other end bearing against the lower end of said shaft for resisting upward movement of said rod for actuating said shearing blades, and an arcuated spring member affixed at one end and whose opposite end bears against the uppermost of said blades to maintain cutting relationship at the edges of said blades.

DUNCAN W. WRIGHT.

REFERENCES CITED

The following references are of record in the file of this patent:

UNITED STATES PATENTS

| Number | Name | Date |
|---|---|---|
| 1,795,421 | Biltz | Mar. 10, 1931 |
| 2,237,238 | Smith | Apr. 1, 1941 |